(12) United States Patent
Wolf et al.

(10) Patent No.: US 10,208,856 B2
(45) Date of Patent: Feb. 19, 2019

(54) PNEUMATIC SHIFTING-FORCE ASSISTANCE DEVICE

(71) Applicant: HOERBIGER AUTOMOTIVE KOMFORTSYSTEME GmbH, Schongau (DE)

(72) Inventors: Jurgen Wolf, Schongau (DE); Krzysztof Kaczmarek, Jastrowie (PL); Wlodzimierz Macke, Olching (DE)

(73) Assignee: HOERBIGER AUTOMOTIVE KOMFORSYSTEME GMBH, Schongau (DE)

( * ) Notice: Subject to any disclaimer, the term of this patent is extended or adjusted under 35 U.S.C. 154(b) by 345 days.

(21) Appl. No.: 15/211,555

(22) Filed: Jul. 15, 2016

(65) Prior Publication Data

US 2016/0319934 A1 Nov. 3, 2016

Related U.S. Application Data

(63) Continuation of application No. PCT/EP2015/000023, filed on Jan. 9, 2015.

(30) Foreign Application Priority Data

Jan. 15, 2014 (DE) .................. 10 2014 000 282

(51) Int. Cl.
*F16H 61/30* (2006.01)
(52) U.S. Cl.
CPC ....... *F16H 61/30* (2013.01); *F16H 2061/301* (2013.01)
(58) Field of Classification Search
CPC .......................... F16H 61/30; F16H 2061/301
See application file for complete search history.

(56) References Cited

U.S. PATENT DOCUMENTS 2,298,012 A * 10/1942 Hruska .................. F16H 61/30
74/335
2,426,722 A * 9/1947 Baade ...................... B60K 5/08
74/335
(Continued)

FOREIGN PATENT DOCUMENTS

DE 195 39 471 A1 4/1997
DE 198 39 850 A1 3/2000
(Continued)

OTHER PUBLICATIONS

International Search Report with Written Opinion issued for corresponding International Patent Application No. PCT/EP2015/000023 dated Oct. 4, 2015.

*Primary Examiner* — Terence Boes
(74) *Attorney, Agent, or Firm* — Myers Wolin, LLC

(57) ABSTRACT

A pneumatic shifting force assistance device for a manual transmission is provided, comprising a housing structure having a compressed air inlet, ventilation, control rod, and an output unit comprising a working piston defining two pneumatic working chambers. A valve arrangement is provided between the control rod and output unit, bringing about a pneumatic sequential control from the outlet unit to the control rod by acting on the working chambers. The valve arrangement comprises two piston structures, two annular sealing edges, two valve slides which interact with the sealing edges, and two valve seats. At least one piston structure/valve slide pair is paired with a throttle device such that a throttle seal arranged on the output unit interacts with a throttle passage arranged on the corresponding valve slide or piston structure, where the effective cross-sectional area of the throttle passage depends on the position of the component within the throttle passage.

12 Claims, 7 Drawing Sheets

(56) References Cited

U.S. PATENT DOCUMENTS

| | | | | |
|---|---|---|---|---|
| 3,572,210 | A | * | 3/1971 | Barton .................... F16H 61/30 91/376 R |
| 5,850,760 | A | * | 12/1998 | Jin ......................... F16H 61/30 74/473.11 |
| 5,857,400 | A | | 1/1999 | Kazumori et al. |
| 2010/0016118 | A1 | | 1/2010 | Fischer et al. |
| 2010/0175493 | A1 | | 7/2010 | Spaeth et al. |
| 2014/0020552 | A1 | | 1/2014 | Macke |

FOREIGN PATENT DOCUMENTS

| | | |
|---|---|---|
| DE | 10 2007 048 400 A1 | 12/2008 |
| DE | 10 2011 015 713 A1 | 10/2012 |
| EP | 1 108 166 B1 | 2/2002 |
| EP | 2 068 044 A2 | 6/2009 |
| EP | 2 076 695 B1 | 2/2011 |
| JP | 2001065687 A | 3/2001 |

\* cited by examiner

PNEUMATIC SHIFTING-FORCE ASSISTANCE DEVICE

CROSS REFERENCE TO RELATED APPLICATIONS

This application is a continuation under 35 U.S.C. §120 of International Application PCT/EP2015/000023, filed Jan. 9, 2015, which claims priority to German Application 10 2014 000 282.9, filed Jan. 15, 2014, the contents of each of which are incorporated by reference herein.

FIELD OF THE INVENTION

The present invention relates to a pneumatic shifting-force assistance device for a manual transmission, comprising a housing structure provided with a compressed-air inlet and a vent, a control rod on the input side that can be displaced along its axis, and an output unit that surrounds the control unit and can be displaced parallel thereto, wherein:

the output unit comprises a working piston guided sealingly in the housing structure and defining two pneumatic working chambers, a valve arrangement, which exerts pneumatic sequential control from the output unit to the control rod by corresponding pressurization of the two pneumatic working chambers, is provided functionally between the control rod and the output unit and fluidically between the compressed-air inlet and the pneumatic working chambers, and the valve arrangement comprises two piston structures coupled with the control rod, guided sealingly and displaceably on the output unit, and two valve slides guided longitudinally displaceably relative to the control rod as well as to the output unit, wherein each piston structure cooperates respectively along a sealing edge with an associated valve slide and each of the two valve slides in turn cooperates respectively with an associated valve seat fixed on the output unit so as to move therewith.

BACKGROUND

Pneumatic shifting-force assistance devices of the type mentioned in the foregoing are used in particular in heavy trucks. They unburden the driver of the vehicle in question by greatly reducing the force that has to be applied by him on the gearstick in order to engage a gear or to change gears. Various such shifting-force assistance devices exist in practice. Pneumatic shifting-force assistance devices of the type mentioned in the introduction are known, for example, from DE 19539471 A1 and a series of protective rights based thereon, such as DE 19839850 A1, EP 1108166 B1, EP 2068044 A2 and EP 2076695 B1, to which reference is made with regard to the constructive details as well as the function.

Specific aspects and in particular a specific problem such as exists for pneumatic shifting-force assistance devices of the type under consideration here are set forth and discussed in DE 102011015713 A1, to which reference is again made and from which contents are adopted. To improve the functionality of the shifting-force assistance devices known up to that time, it is proposed therein to provide flow-through throttle passages on the piston structures (which are guided sealingly and displaceably on the output unit) as well as—associated functionally and spatially with the piston structure in question—respectively one throttle slide, wherein the throttle slide is respectively displaceable relative to the piston structure in question and is biased by means of a spring into a position closing the throttle passages. Depending on the position of the throttle slide relative to the associated piston structure, a defined cross-sectional area of the throttle passage is adjusted. The position of this throttle valve relative to the piston structure depends on the position of the piston structure (which is coupled with the control rod) relative to the output unit. This is achieved by the fact that the throttle slide is stopped against the associated valve seat disposed on the output unit.

In view of the prior art explained in the foregoing, the object of the present invention is to provide a shifting-force assistance device of the type indicated in the introduction that exhibits the advantages associated with the shifting-force assistance device according to DE 102011015713 A1 but is also characterized by a simpler construction.

SUMMARY

This object is achieved by the fact that, in a shifting-force assistance device of the type indicated in the introduction, a throttle device is associated at least with one piston structure/valve slide pair in such a way that a throttle seal fixed on the output unit so as to move therewith cooperates with at least one throttle passage disposed on the valve slide in question or the piston structure in question, and the active cross-sectional area of which depends on the relative position of the component provided with the throttle passage relative to the associated throttle seal. Accordingly, one of the particularly important features in the synergistically functional interaction with the other constructive features of the inventive shifting-force assistance device consists in the fact that—for adjustment of the effective flow cross section of the throttle passage as a function of the relative position of the control rod relative to the output unit—a throttle seal fixed on the output unit so as to move therewith and interacting with the at least one throttle passage is provided. Accordingly, a biasing spring, such as is provided in the shifting-force assistance device according to DE 102011015713 A1 for resetting the throttle slide, is not needed to implement the present device. This is not only a cost aspect. Advantageous effects are also achieved for the necessary overall space in the sense that the inventive shifting-force assistance device can be made even more compactly than that according to DE 102011015713 A1. The operating characteristics are also positively influenced by the embodiments described. After all, neither can a throttle-slide spring jam—because one such is not present—or even suffer damage or break; nor can a throttle slide (which is guided displaceably on the piston structure) jam or be otherwise blocked, since a throttle slide, in contrast to what is provided in DE 102011015713 A1, is also not provided according to the present device. Finally, by implementation of the present device, expanded maneuvering room for the constructive configuration of the shifting-force assistance device is additionally achieved; this is because the throttle passage can be disposed optionally on the piston structure or else on the valve slide. Thus the shifting-force assistance device can be optimally adapted to the respective requirements.

In a preferred improvement of the present device, the at least one throttle passage—preferably several throttle passages respectively distributed uniformly over the circumference are provided—is disposed externally on a shell portion of the piston structure in question or else of the valve slide in question.

If the at least one throttle passage is disposed on the piston structure, the throttle seal is particularly preferably disposed, surrounding the piston structure, on a projection of a structure element on which the valve seat interacting with the associated valve slide is also disposed. This projection of the said structure element is preferably made in the form of a sleeve, wherein an annular throttle seal is received in a circumferential annular groove of the sleeve-like projection of the structure element.

To provide for venting of the respective pneumatic working chamber in the "neutral position" of the control rod relative to the output unit, advantageously a vent passage that is independent of the throttle passage and is opened in the neutral position exists between the respective pneumatic working chamber and the vent. For such a vent passage, it is provided according to the preferred embodiment of the present device having particularly simple construction that the throttle seal lifts from the piston structure in the neutral position, in order to release a vent passage. In contrast, if the throttle seal in the said neutral position (of the control slide and the output unit relative to one another) does not lift from the piston structure, which for its part is associated with certain advantages, it is provided according to another preferred improvement of the present device that the projection of the structure element explained hereinabove, on which the throttle seal is disposed, is perforated by a vent bore; in this case a separate seal element (e.g. an O-ring that internally bears slidingly on the projection of the structure element) is disposed on the piston structure and closes the vent bore when—by corresponding displacement of the piston structure relative to the structure element—the throttle passage is released or the piston structure is sealed against the valve slide via a sealing edge.

If the at least one throttle passage is provided not on the piston structure but instead on the valve slide, especially externally on a shell portion thereof, which is advantageous especially in view of the provision of technically simple venting of the respective working chamber in the neutral position, it can be provided according to a preferred improvement of the device having particularly simple construction and also permitting particularly compact overall dimensions that the valve seat (which cooperates with the valve slide) is formed by the throttle seal. This is nevertheless in no way absolutely required. To the contrary, the said valve seat can also be made spatially and functionally independent of the throttle seal, which may prove favorable for optimization of the overall function.

The present device also proves to be extremely advantageous as regards the possibilities of adapting the throttle device of the shifting-force assistance device (with little complexity) to the respective requirements, such as they are predetermined in particular due to the other components of the drive train of the vehicle in question (engine, clutch, transmission). In this way especially shifting-force assistance devices with otherwise identical construction can be adapted merely by adapting the design of the component provided with the at least one throttle passage, i.e. specifically the individual configuration and/or arrangement of the at least one throttle passage, to the respective requirements with respect to the throttling behavior.

Depending on the required throttling behavior, the at least one throttle passage may be deeper or else shallower, broader or else narrower over its axial extent, depending on whether a decreasing or else an increasing throttling effect is to be provided. It is also conceivable that the at least one throttle passage at first expands (or becomes deeper) and then becomes narrower (or shallower) once again, or vice versa; in this way the throttling behavior passes through an extreme value in the course of the displacement travel of the component provided with the at least one throttle passage relative to the throttle device. Several throttle passages provided on the same component may have different geometries. Furthermore, they may be axially offset from one another, so that—with continued displacement of the component provided with the throttle passages relative to the throttle seal—their effect develops in staggered manner or ends in staggered manner. Obviously diverse variants and combinations are possible in order to achieve an individually optimum operating characteristic.

Diverse technical, constructive and/or functional aspects, as set forth, described and explained in detail in DE 102011015713 A1, also prove to be advantageous in implementation of the present device. In order to avoid unnecessary repetitions, reference with respect to these aspects is made to DE 102011015713 A1, the entire contents of which are included in the contents of the present patent application by reference.

BRIEF DESCRIPTION OF THE DRAWINGS

The present invention will be explained in more detail hereinafter on the basis of several exemplary embodiments illustrated in the drawing, wherein.

DETAILED DESCRIPTION OF THE PREFERRED EMBODIMENTS

Figure 1:
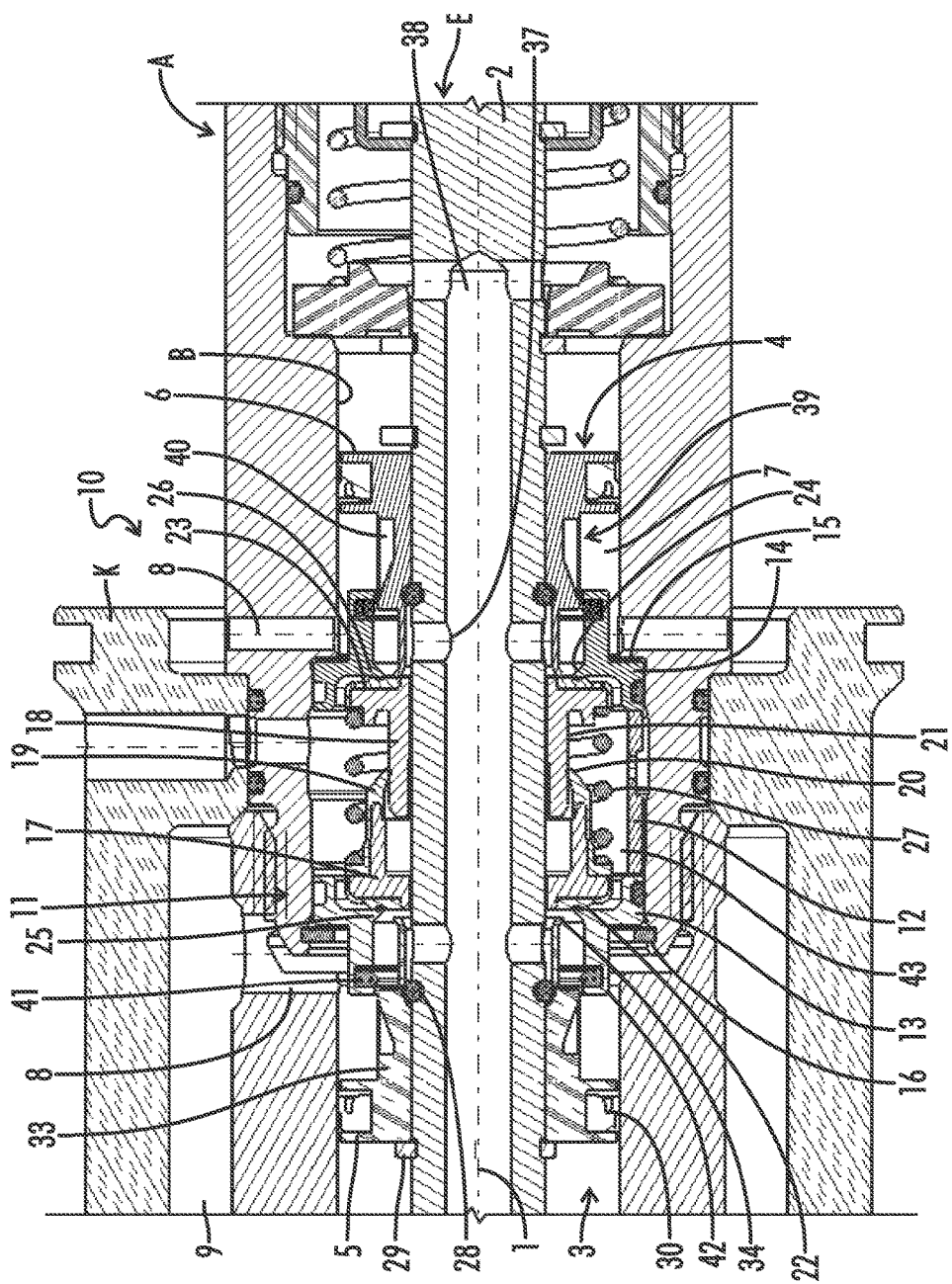
FIG. 1 shows a longitudinal section through a relevant region in a first exemplary embodiment of a pneumatic shifting-force assistance device.

As regards basic design features, the shifting-force assistance devices according to the exemplary embodiments illustrated in the drawing correspond to the prior art in DE 102011015713 A1. In particular, the exemplary embodiments of the shifting-force assistance device illustrated here are also provided respectively with three primary functional units, albeit not necessarily shown in the drawing, namely a housing structure, an input unit E and an output unit A surrounding it, wherein input unit E and output unit A are displaceable along axis 1 relative to one another and relative to the housing structure. The housing structure and output unit A (with working piston K) are designed substantially as can be inferred from DE 102011015713 A1, to which reference is made in this respect.

In each of the illustrated exemplary embodiments, two piston structures 3, 4 are coupled with control rod 2 of the input unit so as to move therewith. Each of the two piston structures 3, 4 comprises an actual valve piston 5 or 6, which is guided sealingly and displaceably to define an associated prechamber 7 in a cylindrical bore B of output unit A. Each of the two prechambers 7 is in communication via a duct 8 with an associated pneumatic working chamber 9, 10. The two piston structures 3, 4 form a functional component of a valve arrangement 11, which is provided functionally between control rod 2 and output unit A and fluidically between a compressed-air inlet disposed on the housing structure and the two pneumatic working chambers 9, 10, and which exerts pneumatic sequential regulation from output unit A to input unit, i.e. control rod 2, by corresponding pressurization of the two pneumatic working chambers 9, 10 with compressed air. In detail, this valve arrangement 11 is constructed as set forth in the following:

As illustrated in FIG. 1, two structure elements 13, 14 are received in output unit A, at a predetermined spacing defined and maintained by a spacer sleeve 12, so as to move therewith. Such movement therewith is assured on the one hand by means of a shoulder 15 and on the other hand by means of a locking ring 16. Two valve slides 17, 18, both guided displaceably on control rod 2 and sealed relative to one another, are received in the space between the two structure elements 13, 14. For the purpose of sealing, an elastomeric sealing element 19, which has a radial annular sealing edge 20, which slides sealingly on a cylindrical sealing face 21 of the other valve slide 18, is joined to the one valve slide 17. Furthermore, both valve slides 17, 18 are respectively provided at their ends with an elastomeric sealing face 22 or 23 respectively, also of elastomer, which cooperates via sealing edge 24 of a valve seat 25 or 26 constructed on the respective associated structure element 13 or 14. By means of a compression spring arrangement 27 disposed between the two valve slides 17, 18, the two valve slides 17, 18 are biased against the respective associated valve seat 25 or 26.

Each of the two piston structures 3 and 4 fixed between an O-ring 28 and a locking ring 29 on control rod 2 comprises not only the actual valve piston 5 or 6 sliding sealingly on output unit A and provided with O-ring 30 but also a cylindrical extension 33. At each end face thereof, an annular sealing edge 34 is formed (on a projection) that can cooperate respectively with the associated valve slide 17 or 18, in order to lift this from the valve seat 25 or 26 in question and at the same time to seal the piston structure and valve slide relative to another. For this purpose annular sealing edge 34 is disposed radially inside the associated valve seat 25 or 26, opposite elastomeric sealing face 22 or 23 of the valve slide 17 or 18 in question. In the neutral position ("zero position") illustrated in the drawing, however, the two annular sealing edges 34 respectively maintain a predetermined spacing from valve slides 17 or 18, so that an annular gap, which communicates with a vent disposed at the end face on the housing structure via an exhaust-air passage comprising an individual radial bore 37 and a common axial bore 38 in control rod 2, respectively exists between the sealing edge 34 in question and the associated valve slide 17 or 18.

Furthermore, two throttle passages 39 disposed in equally spaced manner around the axis are formed respectively on the two piston structures 3 or 4, namely on the cylindrical extensions 33 thereof. These throttle passages 39 are respectively formed by a groove 40 made in the respective extension 33 of piston structure 3 or 4, the radial depth of which varies in axial direction of control rod 2, namely increases in the direction of the respective valve piston 5 and 6.

Throttle passages 39 cooperate respectively with an annular throttle seal 41, which is fixed on output unit A so as to move therewith, namely in an annular groove of an annular projection 42 formed on the respective associated structure element 13, 14. In the neutral position illustrated in FIG. 1, an annular gap exists between throttle seal 41 and associated extension 33 of piston structure 3 or 4 in question; the annular gap is a component of the respective vent passage from pneumatic working chamber 9 or 10 in question via associated duct 8, prechamber 7, the annular gap between sealing edge 34 of piston structure 3 or 4 and valve slide 17 or 18, respective individual bore 17 and common bore 38. However, if the control rod is displaced from the neutral position, one of the piston-structure sealing edges 34—depending on the direction of movement of piston rod 2—comes into sealing contact on the associated valve slide 17 or 18, and at the same time the associated piston-structure 33 enters throttle seal 41 or comes to bear on it. With further continued displacement of control rod 2, piston structure 3 or 4 lifts the associated valve slide 17 or 18 from the respective valve seat 25 or 26, and at the same time throttle passage 39 is opened, wherein the size of the effective flow cross section of throttle passage 39 depends on how far control rod 2 is displaced relative to the output unit. The pneumatic working chamber 9 or 10 in question is pressurized from compressed-air chamber 43 and in fact—depending on the position of control rod 2 relative to output unit A—is throttled more or less strongly. In contrast, on the opposite side of valve unit 11, the vent passage described hereinabove is opened and the pneumatic working chamber 9 or 10 in question is depressurized.

Figure 2:
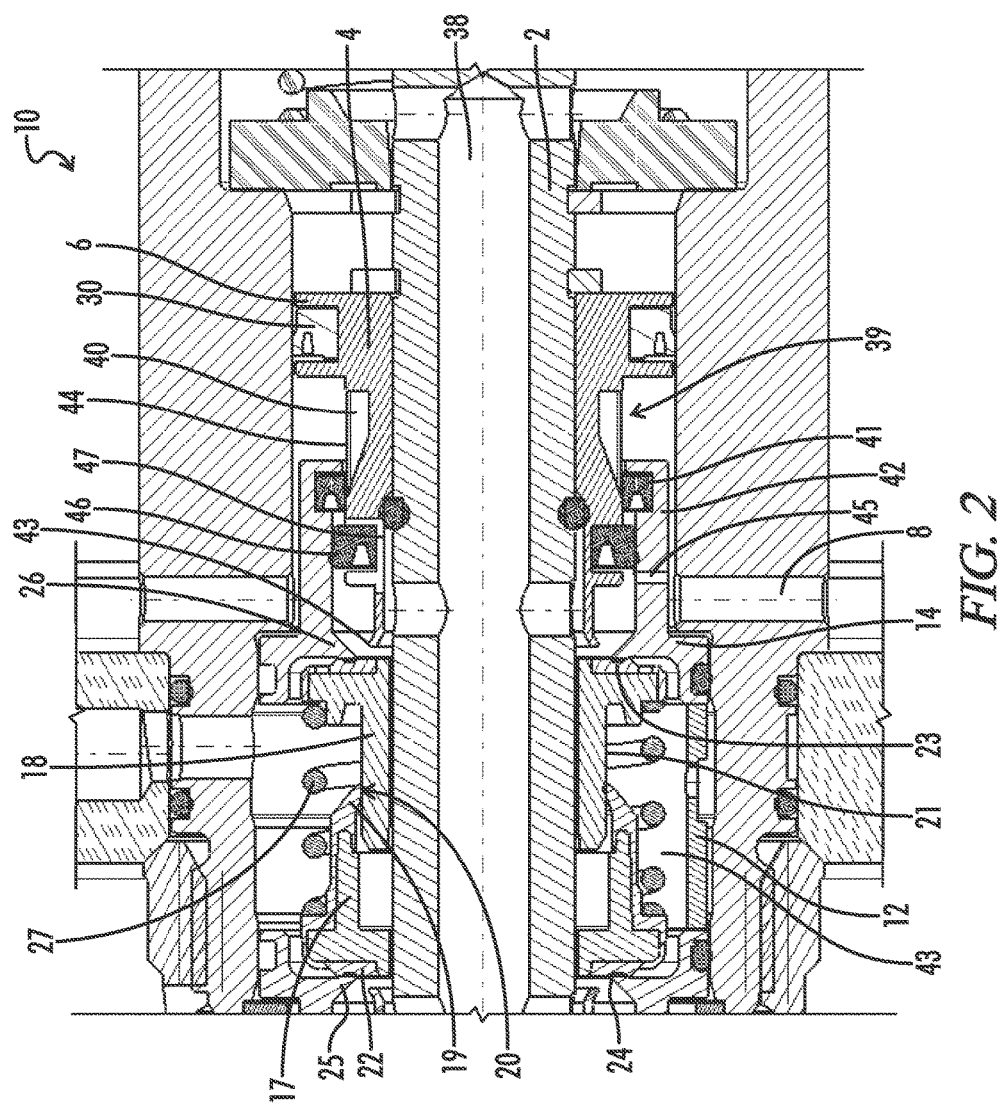
FIG. 2 shows a longitudinal section (enlarged compared with FIG. 1) through a relevant region in a second exemplary embodiment of a pneumatic shifting-force assistance device.

The second exemplary embodiment illustrated in FIG. 2 differs from that according to FIG. 1 as follows: Throttle seal 41 here is in constant contact against extension 33 of the associated piston structure 3 or 4; it bears constantly, i.e. even in the neutral position, on cylindrical—with the exception of groove 40—surface 44 of the respective extension 33. In contrast, the vent passages for pneumatic working chambers 9, 10 respectively comprise a separate vent bore 45, which passes through annular projection 42 of the structure element 13 or 14 in question and communicates constantly with the associated duct 8. Vent bore 45 associated with pneumatic working chamber 10 as shown in FIG. 2 is closed by sealing element 46 disposed on piston structure 4 when piston rod 2 together with piston structure 4 fixed thereon is moved so far left that sealing edge 34 of piston structure 4 is sealed against valve slide 18 and begins to lift this from valve seat 26, and at the same time throttle seal 41 begins to open throttle passage 39. Via several compressed-air passages 47 extending continuously underneath sealing element 46, i.e. between this and piston structure 4, compressed air from compressed-air chamber 43 reaches throttle passage 39 and from there reaches duct 8. A corresponding sequence takes place for the second functional side of valve unit 11 during displacement of control rod 2 in the opposite direction.

Otherwise the structure and function of the exemplary embodiments according to FIG. 2 are evident from FIG. 1 and the foregoing explanations of the first exemplary embodiment shown therein.

Figure 3:
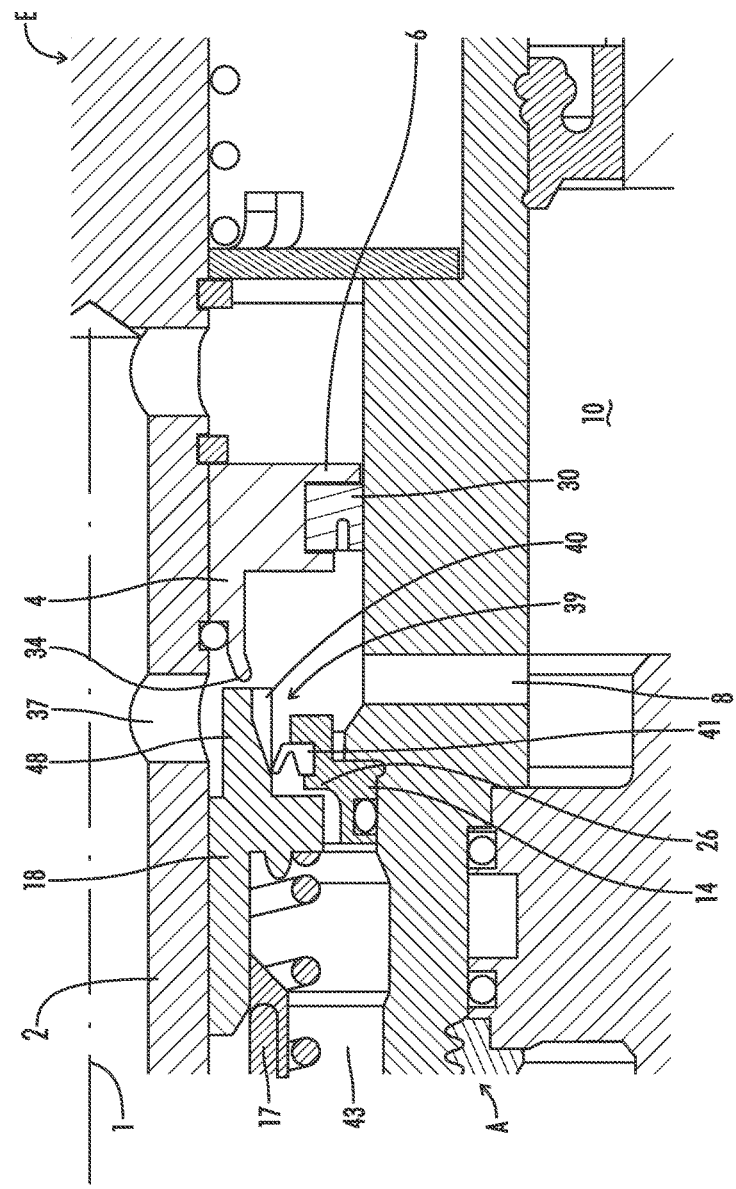
FIG. 3 shows a longitudinal section (further enlarged compared with FIG. 2) through a relevant region in a third exemplary embodiment of a pneumatic shifting-force assistance device.
Figure 4:
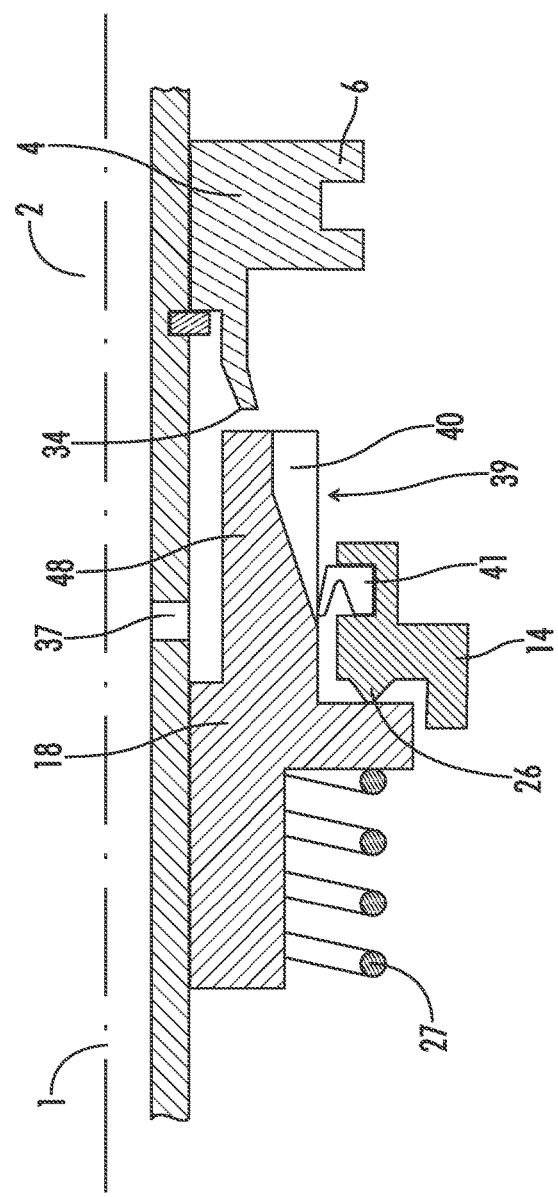
FIG. 4 shows, in a longitudinal section, a detail view of the exemplary embodiment illustrated in FIG. 3.
Figure 5:
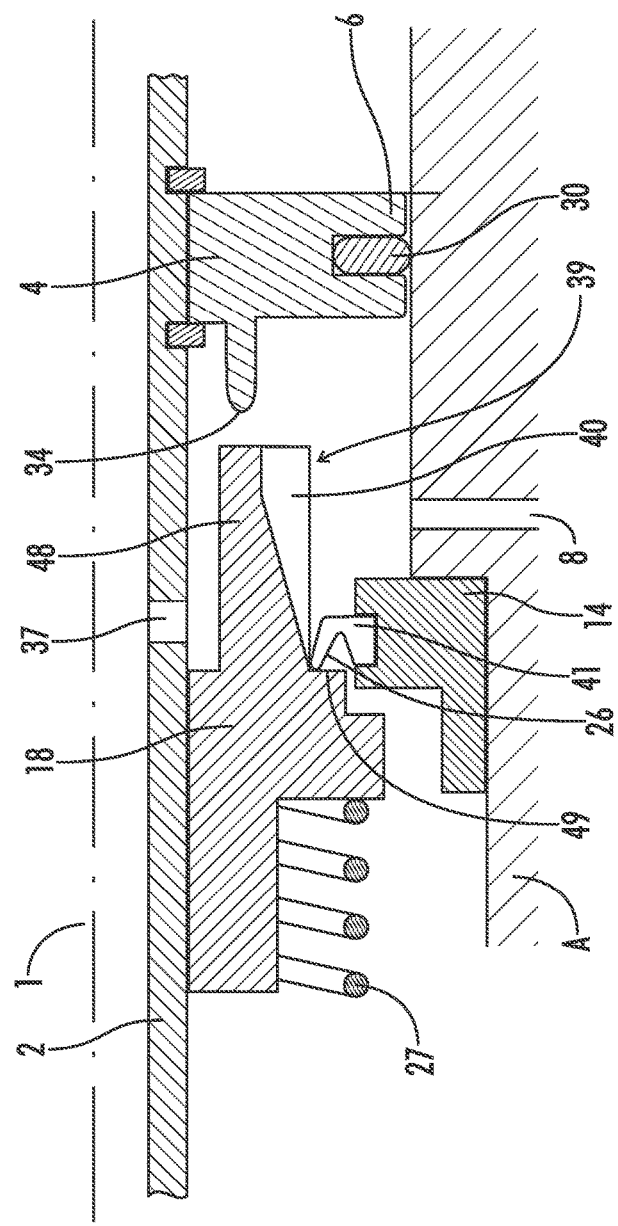
FIG. 5 shows a modification of the construction according to FIGS. 3 and 4.

FIGS. 3, 4 and 5 illustrate—respectively in the scope of the relevant details—exemplary embodiments in which throttle passages 39, in contrast to those in the exemplary embodiments according to FIGS. 1 and 2, are disposed not on piston structures 3 and 4 but instead on valve slides 17 and 18. According to FIG. 3, valve slide 18 (associated with pneumatic working chamber 10) is provided for this purpose with—projecting toward piston structure 4—an annular extension 48. Two grooves 40 defining throttle passages 39 are made therein. The radial depth of these grooves 40 becomes larger along their axial extent toward piston structure 4. As in the exemplary embodiments described hereinabove, sealing edge 34 of piston structure 4—during a corresponding displacement of control rod 2 toward the left—bears on valve slide 18 (in this case at its end on its extension 48) and lifts valve slide 18 from the associated valve seat 26 upon continued movement. Compressed air passes from compressed-air chamber 43 through the annular gap between valve slide 18 and valve seat 26, throttle passage 39 and duct 8 into pneumatic working chamber 10. Valve seat 26 is formed (see also the detail drawing according to FIG. 4) on a structure element 14, which is mounted on output unit A so as to move therewith and which also receives throttle seal 41 cooperating with groove 40. The effective cross-sectional area of throttle passage 39 available for the through flow of compressed air depends on the position of valve slide 18 relative to output unit A, which in turn depends on the position of control rod 2 relative to output unit A.

Otherwise the structure and function of the exemplary embodiments according to FIGS. 3 and 4 are evident from FIGS. 1 and 2 as well as the foregoing explanations of the first and second exemplary embodiment shown therein.

The exemplary embodiment illustrated in FIG. 5 corresponds largely to that according to FIGS. 3 and 4. The main difference lies in the fact that throttle seal 41 here additionally assumes the function of valve seat 26 of the exemplary embodiments explained hereinabove. Thus, in the neutral position of the shifting-force assistance device, throttle seal 41 seals valve slide 18 relative to the output unit, by the fact that it bears with its end face on shoulder 49 of valve slide 18.

Figure 6:
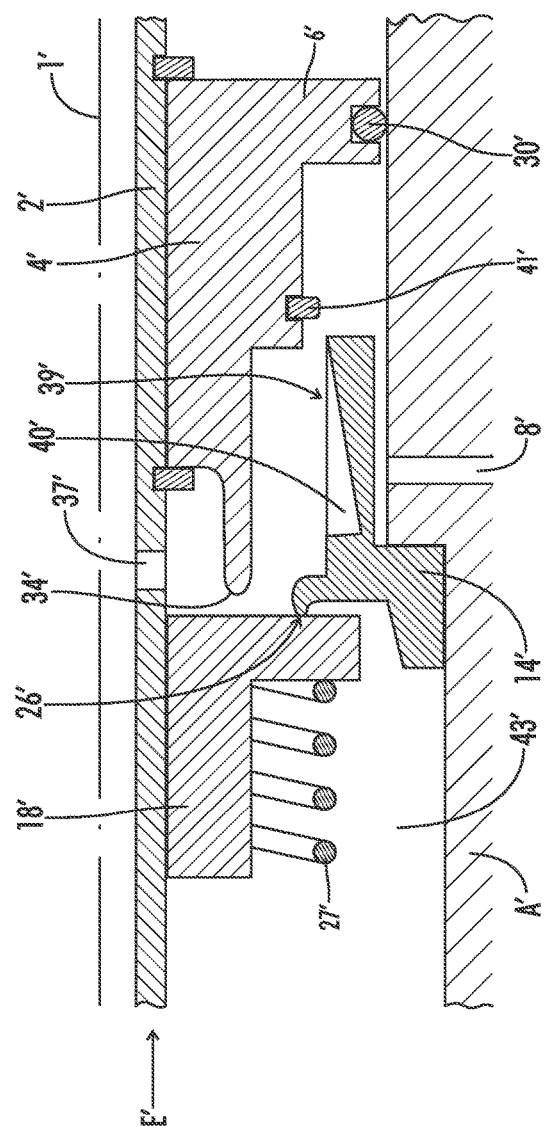
FIG. 6 shows yet another constructive implementation of a pneumatic shifting-force assistance device.

FIG. 6 schematically shows a constructive implementation of the present invention that differs from the exemplary embodiments explained in the foregoing to the extent that in this case the at least one throttle passage 39' (formed by groove 40') is disposed not on piston structure 4' or on valve slide 18' but instead on structure element 14' (which is fixed in output unit A' so as to move therewith). For this purpose, it has an annular extension projecting toward piston structure 4' and partly surrounding it. The radial depth of the throttle passage increases toward valve slide 18'.

Throttle seal 41' is mounted in an annular groove on piston structure 4'. In the neutral position of the shifting-force assistance device illustrated in FIG. 6, it is lifted slightly from extension of structure element 14' to form an annular vent passage. If piston rod 2' (with piston structure 4') is displaced toward the left, sealing edge 34' of piston structure 4' comes into sealing contact against valve slide 18'. At the same time, throttle seal 41' reaches the outer circumference of extension of structure element 14' and closes the vent passage. The further function of the embodiment according to FIG. 6, such as in particular the throttling (which depends on the position of control rod 2' relative to output unit A') of the pressurization of pneumatic working chamber 10' through throttle passage 19', is immediately obvious from the foregoing explanations of the exemplary embodiments according to FIGS. 1 to 5.

The advantages compared with the prior art, achievable with the embodiment according to FIG. 6, correspond substantially to those expounded hereinabove with regard to the implementation of the present device with a throttle seal fixed on the output unit so as to move therewith.

Figure 7:
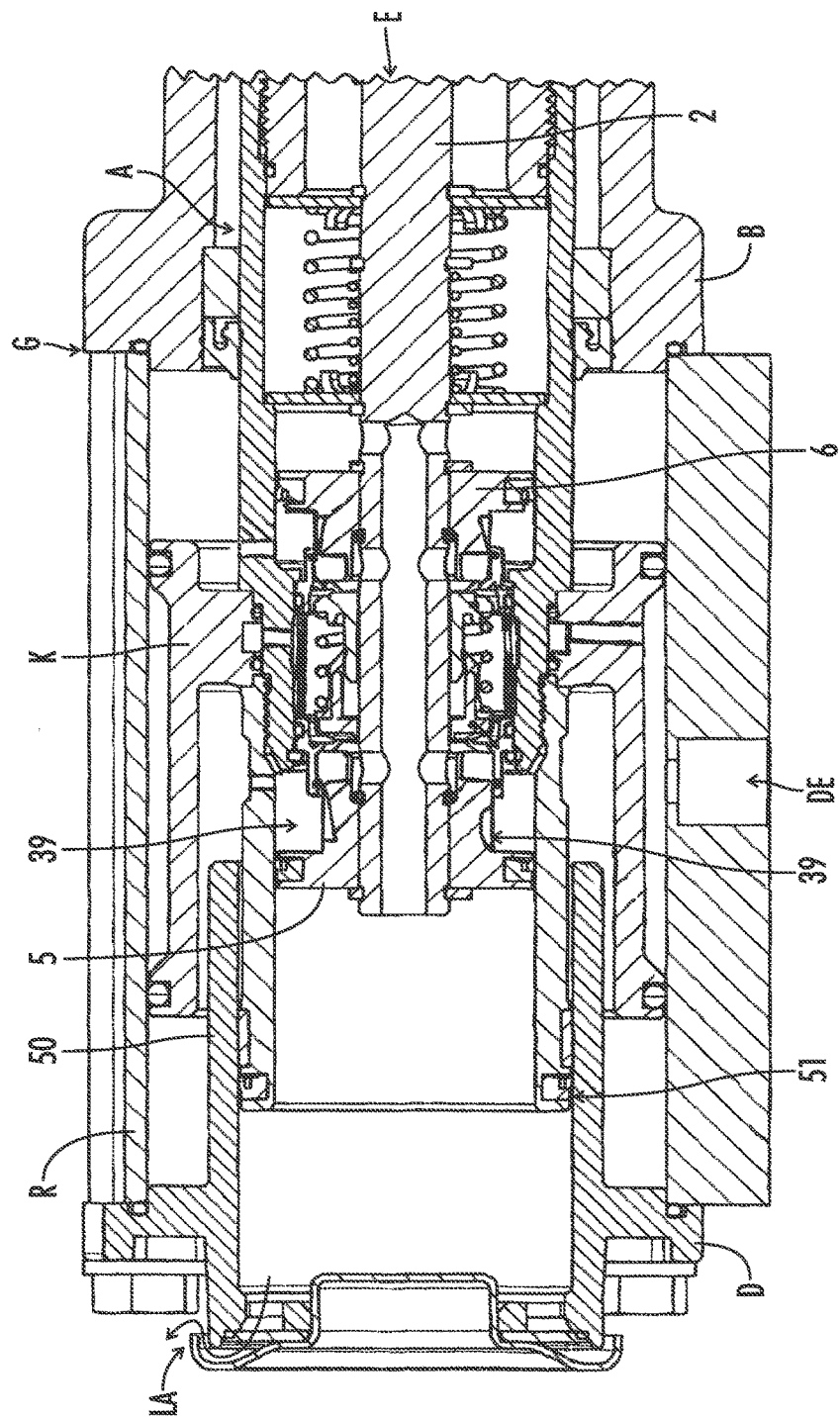
FIG. 7 shows a longitudinal section through a segment, larger than that reproduced in FIG. 1, of a pneumatic shifting-force assistance device but corresponding largely in technical and functional capability to that shown in FIG. 1.

FIG. 7 shows a longitudinal section through a segment, larger than that reproduced in FIG. 1, of a pneumatic shifting-force assistance device corresponding largely in technical and functional capability to that shown in FIG. 1. To that extent, reference is made to the explanations for FIG. 1 as regards technical details not otherwise presented in the following explanations. What is visible in FIG. 7 is housing G, which consists substantially of three main components, namely a tubular middle part R, a cover D and a bottom B. Cover D and bottom B are joined tightly to tubular middle part R. A sleeve-like extension 50, which projects into tubular middle part R and is sealed relative to output unit A (seal 51), is provided on cover D. Furthermore, the vent is provided on the cover (see air outlet LA). In contrast, compressed-air inlet DE is disposed on tubular middle part R, in which piston K is sealingly guided.

Furthermore, the possibility—described in detail hereinabove—that several throttle passages 39 provided on the same component (in this case valve piston 5) may have a different geometry and be disposed axially offset from one another is illustrated in FIG. 7.

What is claimed is:

1. A pneumatic shifting-force assistance device for a manual transmission, comprising a housing structure (G) provided with a compressed-air inlet (DE) and a vent (LA), a control rod (2) on the input side that can be displaced along its axis (1), and an output unit (A) that surrounds the control unit and can be displaced parallel thereto, wherein:
    the output unit (A) comprises a working piston (K) guided sealingly in the housing structure and defining two pneumatic working chambers (9, 10);
    a valve arrangement (11), which exerts pneumatic sequential control from the output unit (A) to the control rod (2) by corresponding pressurization of the two pneumatic working chambers (9, 10), is provided functionally between the control rod (2) and the output unit (A) and fluidically between the compressed-air inlet and the pneumatic working chambers (9, 10);
    the valve arrangement (11) comprises two piston structures (3, 4) coupled with the control rod (2), guided sealingly and displaceably on the output unit (A), and two valve slides (17, 18) guided longitudinally displaceably relative to the control rod (2) as well as to the output unit (A), wherein each piston structure (3, 4) cooperates respectively along a sealing edge (34) with an associated valve slide (17, 18) and each of the two valve slides (17, 18) in turn cooperates respectively with an associated valve seat (25, 26) disposed on the output unit (A) so as to move therewith;
    a throttle device is associated at least with one piston structure/valve slide pair in such a way that a throttle seal (41) disposed on the output unit (A) so as to move therewith cooperates with at least one throttle passage (39) disposed on the valve slide (17, 18) in question or the piston structure (3, 4) in question, and the active cross-sectional area of which depends on the relative position of a component provided with the throttle passage (39) relative to the associated throttle seal (41).

2. The shifting-force assistance device of claim 1, wherein the at least one throttle passage (39) is disposed on the piston structure (3, 4) in question.

3. The shifting-force assistance device of claim 2, wherein the at least one throttle passage (39) is disposed externally on a shell portion of the piston structure (3, 4) in question.

4. The shifting-force assistance device of claim 2, wherein the throttle seal (41) is disposed, surrounding the piston structure (3, 4), on a projection (42) of a structure element (13, 14) on which the valve seat (25, 26) interacting with the associated valve slide (17, 18) is also disposed.

5. The shifting-force assistance device of claim 2, wherein a vent passage that is independent of the throttle passage (39) exists between the associated working chamber (9, 10) and the vent in a neutral position of the control rod (2) relative to the output unit (A).

6. The shifting-force assistance device of claim 5, wherein the throttle seal (41) lifts from the piston structure (3, 4) in the neutral position, in order to release the vent passage.

7. The shifting-force assistance device of claim 4 wherein a vent passage that is independent of the throttle passage (39) exists between the associated working chamber (9, 10) and the vent in a neutral position of the control rod (2) relative to the output unit (A), and wherein the projection (42) of the structure element (13, 14) is perforated by a vent bore (45) and a seal element (46), which closes the vent bore (45) when the throttle passage (39) is released, is disposed on the associated piston structure (3, 4).

8. The shifting-force assistance device of claim 1, wherein at least one throttle passage (39) is disposed on the valve slide (17, 18).

9. The shifting-force assistance device of claim 8, wherein at least one throttle passage (39) is disposed externally on a shell portion of the valve slide (17, 18) in question.

10. The shifting-force assistance device of claim 8, wherein the valve seat (25, 26) is formed by the throttle seal (41).

11. The shifting-force assistance device of claim 8, wherein the valve seat (25, 26) is made spatially and functionally independent of the throttle seal (41).

12. The shifting-force assistance device of claim 1, wherein the throttle seal (41') is fixed not on the output unit (A') so as to move therewith but instead on the piston structure (4'), and in that the at least one throttle passage (39') is disposed not on the valve slide (18') or the piston structure (4') but instead on the output unit (A') so as to move therewith.

* * * * *